(12) United States Patent
Song et al.

(10) Patent No.: US 11,999,096 B2
(45) Date of Patent: Jun. 4, 2024

(54) PROTECTION FILM ATTACHING APPARATUS AND PROTECTION FILM ATTACHING METHOD USING THE APPARATUS

(71) Applicant: DMT SOLUTION CO., LTD, Gumi-si (KR)

(72) Inventors: Inyong Song, Seongnam-si (KR); Dong Guen Kwag, Suwon-si (KR)

(73) Assignee: DMT SOLUTION CO., LTD, Gumi-si (KR)

( * ) Notice: Subject to any disclaimer, the term of this patent is extended or adjusted under 35 U.S.C. 154(b) by 230 days.

(21) Appl. No.: 17/416,019

(22) PCT Filed: Dec. 23, 2019

(86) PCT No.: PCT/KR2019/018347
§ 371 (c)(1),
(2) Date: Jun. 18, 2021

(87) PCT Pub. No.: WO2020/138897
PCT Pub. Date: Jul. 2, 2020

(65) Prior Publication Data
US 2022/0063181 A1 Mar. 3, 2022

(30) Foreign Application Priority Data
Dec. 24, 2018 (KR) .................. 10-2018-0168811

(51) Int. Cl.
*B29C 63/00* (2006.01)
*B29C 63/02* (2006.01)
*B29C 63/48* (2006.01)

(52) U.S. Cl.
CPC .......... *B29C 63/48* (2013.01); *B29C 63/0004* (2013.01); *B29C 63/02* (2013.01); *B29C 2063/022* (2013.01); *B29C 2063/488* (2013.01)

(58) Field of Classification Search
CPC ........ B29C 2063/022; B29C 2063/488; B29C 63/48
See application file for complete search history.

(56) References Cited

U.S. PATENT DOCUMENTS

| | | | |
|---|---|---|---|
| 6,347,201 B1 * | 2/2002 | Sano | G03G 15/2064 219/243 |
| D970,569 S * | 11/2022 | Zeng | |
| 2006/0047336 A1 * | 3/2006 | Gale | A61F 2/958 623/1.11 |

FOREIGN PATENT DOCUMENTS

| | | | | |
|---|---|---|---|---|
| EP | 3120971 A1 | 1/2017 | | |
| KR | 20100091524 | * | 8/2010 | G02B 5/3033 |

(Continued)

OTHER PUBLICATIONS

KR20160050949 (Joong) May, 2016 (online machine translation), [Retrieved on Apr. 17, 2023]. Retrieved from: Espacenet (Year: 2016).*

(Continued)

*Primary Examiner* — Arrie L Reuther
*Assistant Examiner* — Andrés E. Behrens, Jr.
(74) *Attorney, Agent, or Firm* — NKL LAW; Jae Youn Kim

(57) ABSTRACT

Provided is a protection film attaching apparatus according to the present invention comprising: a housing; a jig installed on an upper surface of the housing and fixing one side of a protection film; a gripper installed on one side of the housing and elastically supporting another side of the protection film vertically; and a film attaching part installed in the housing to move in a lengthwise direction of the jig so as to pressurize and attach the protection film onto a glass surface of an electronic device. According to the description above, when a protection film is attached onto a surface of glass having curved edges, air bubbles are not generated on (Continued)

the surface of the glass, and an attaching process becomes easier and more effectively done.

8 Claims, 7 Drawing Sheets

(56) References Cited

FOREIGN PATENT DOCUMENTS

| KR | 10-1069832 B1 | | 10/2011 | | |
|---|---|---|---|---|---|
| KR | 10-2016-0050949 A | | 5/2016 | | |
| KR | 20160050949 A | * | 5/2016 | ............ | B65H 37/04 |
| KR | 10-2017-0104686 A | | 9/2017 | | |
| KR | 20170104686 | * | 9/2017 | | |
| KR | 10-1978166 B1 | | 5/2019 | | |
| KR | 10-2015330 B1 | | 8/2019 | | |
| WO | 2015-012261 A1 | | 1/2015 | | |
| WO | WO-2017215684 A1 | * | 12/2017 | ............ | B29C 51/04 |
| WO | WO-2018072767 | * | 4/2018 | ............ | B29C 51/10 |

OTHER PUBLICATIONS

WO-2017215684-A1 (Rehrl) Dec. 2017 (online machine translation), [Retrieved on Aug. 9, 2023]. Retrieved from: Espacenet (Year: 2017).*

KR-20100091524 (Woo) Aug. 2010 (online machine translation), [Retrieved on Aug. 9, 2023]. Retrieved from: Espacenet (Year: 2010).*

KR-20170104686 (Su) Sep. 2017 (online machine translation), [Retrieved on Aug. 9, 2023]. Retrieved from: Espacenet (Year: 2017).*

WO-2018072767(Dandl) Apr. 26, 2018 (online machine translation), [Retrieved on Aug. 9, 2023]. Retrieved from: Espacenet (Year: 2018).*

Wikipedia's Article on Implant Induction Wielding of Thermoplastics (Year: 2022).*

Doug Care Equipment. www.dougcareequipment.com/aie-300him-magnetic-impulse-sealer. (Year: 2017).*

* cited by examiner

PROTECTION FILM ATTACHING APPARATUS AND PROTECTION FILM ATTACHING METHOD USING THE APPARATUS

TECHNICAL FIELD

The present invention relates to a protection film attaching apparatus for easily attaching a protection film onto a display glass of a device such as a smartphone.

TECHNICAL BACKGROUND

In general, electronic devices such as smartphones and tablet PCs need a protection film on the glass surface displaying the screen to prevent scratches.

Such a protection film is provided as a protective film attached onto a smoothly coated paper, and most users manually remove the paper from the back of the protection film and attach the protection film onto the glass of the electronic device.

However, if the protection film is manually attached onto an object, the quality of the result is poor even if done by a skilled person, and many defects occur because the protection film is not uniformly attached in the correct position.

Recently, as many electronic devices with glass having curved surfaces at both corners are used, defects such as air bubbles are more easily generated when a worker attaches a protection film onto the glass surface, and it is not attached airtightly.

DETAILED DESCRIPTION OF THE INVENTION

Problem to be Solved

The present invention has been created in order to solve the above problems, and an object of the present invention is to provide a more convenient and effective protection film attaching apparatus capable of airtightly attaching a protection film onto a glass surface in a curved shape.

Technical Solution

To this end, the protection film attaching apparatus according to one aspect of the present invention comprises: a housing; a jig installed on an upper surface of the housing where an electronic device is mounted; a first fixing part installed on one side of the jig and fixing one side of a protection film; a gripper installed on one side of the housing and elastically supporting another side of the protection film vertically; a film attaching part installed in the housing to move in a lengthwise direction of the jig so as to pressurize and attach the protection film onto a glass surface of the electronic device.

According to one aspect of the present invention, the housing includes: an upper shelf on which the jig is fixed; two pairs of side panels respectively coupled to each edge of the upper shelf; a lower panel for connecting lower parts of the two pairs of side panels wherein the upper shelf includes a through-hole in a predetermined length in the lengthwise direction of the jig on both sides of the jig.

Effects of the Invention

As described above, according to the protection film attaching apparatus of the present invention, when a protection film is attached onto a surface of glass having curved edges, it is attached airtightly, preventing air bubbles on the surface of the glass, and an attaching process becomes easier and more effectively done.

BRIEF DESCRIPTION OF DRAWINGS

FIG. 4 is a perspective view showing the lower part of the elastic block of the gripper of

FIG. 3.

Figure 1:
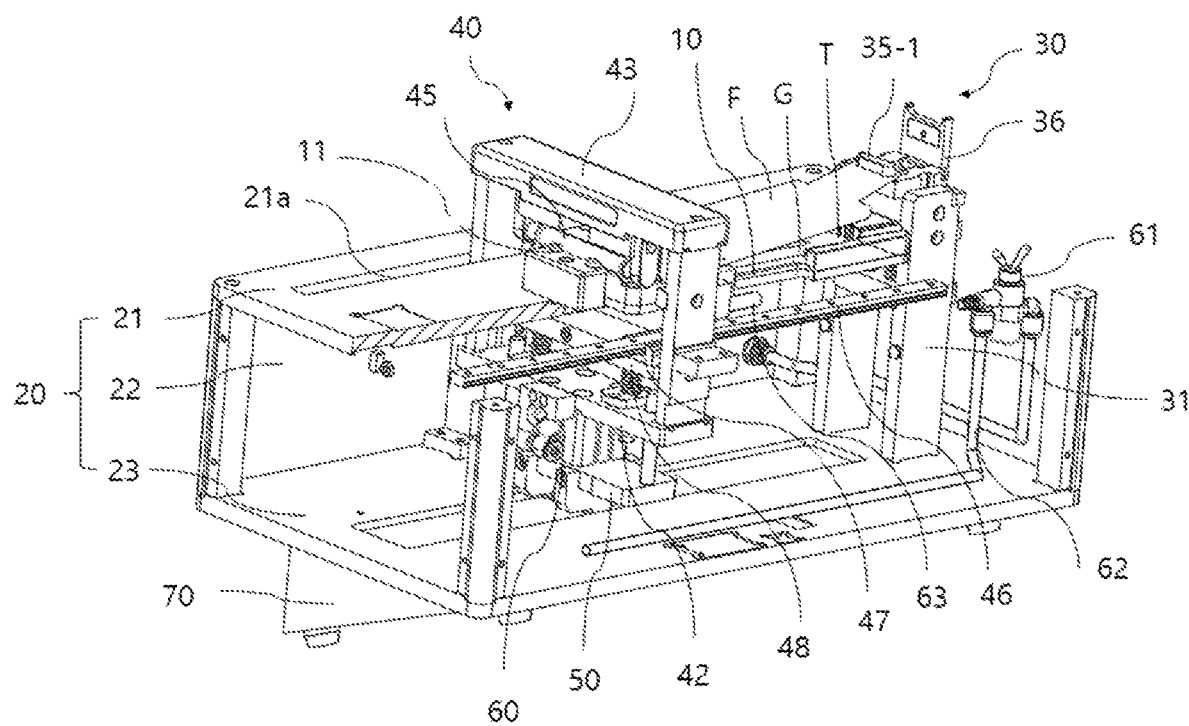
FIGS. 1 and 2 are perspective views showing a protection film attaching apparatus according to an embodiment of the present invention.

10: jig
11: first fixing part
20: housing
30: gripper
31: vertical plate
31-1: guide protrusion
31-2: elastic block stopper groove
32: horizontal plate
33: circular protrusion
34: first spring
35: elastic block
35-1: second fixing part
36: film pressing cover
36-1: iron plate
36-2: stopper bar
40: film attaching part
41: standing bar
42: lower end connecting bar
43: upper end connecting bar
44: first roller
45: second roller
46: rail
47: moving body
48: middle bar
49: elastic bar
50: supporting bar
60: air cylinder
61: switch
62: air hose
63: switch operating bar
70: leg
F: protection film
G: glass
H: hinge
M: magnetic body
T: electronic device
θ: tilt angle

BEST MODE FOR CARRYING OUT THE INVENTION

Hereinafter, embodiments of the present invention will be described in detail with reference to drawings.

Prior to this, terms or words used in the specification and claims should not be construed as being limited to their usual or dictionary meanings, and should be interpreted as meanings and concepts consistent with the technical idea of the present invention according to the principle that the inventors can appropriately define the concepts of terms in order to explain their own invention in the best way.

Therefore, the embodiments described in the present specification and the configurations shown in the drawings are only the most preferred embodiments of the present invention, and do not represent all of the technical ideas of the present invention. Thus, it should be understood that there may be various equivalents and variations that can replace those embodiments and configurations.

Figure 2:
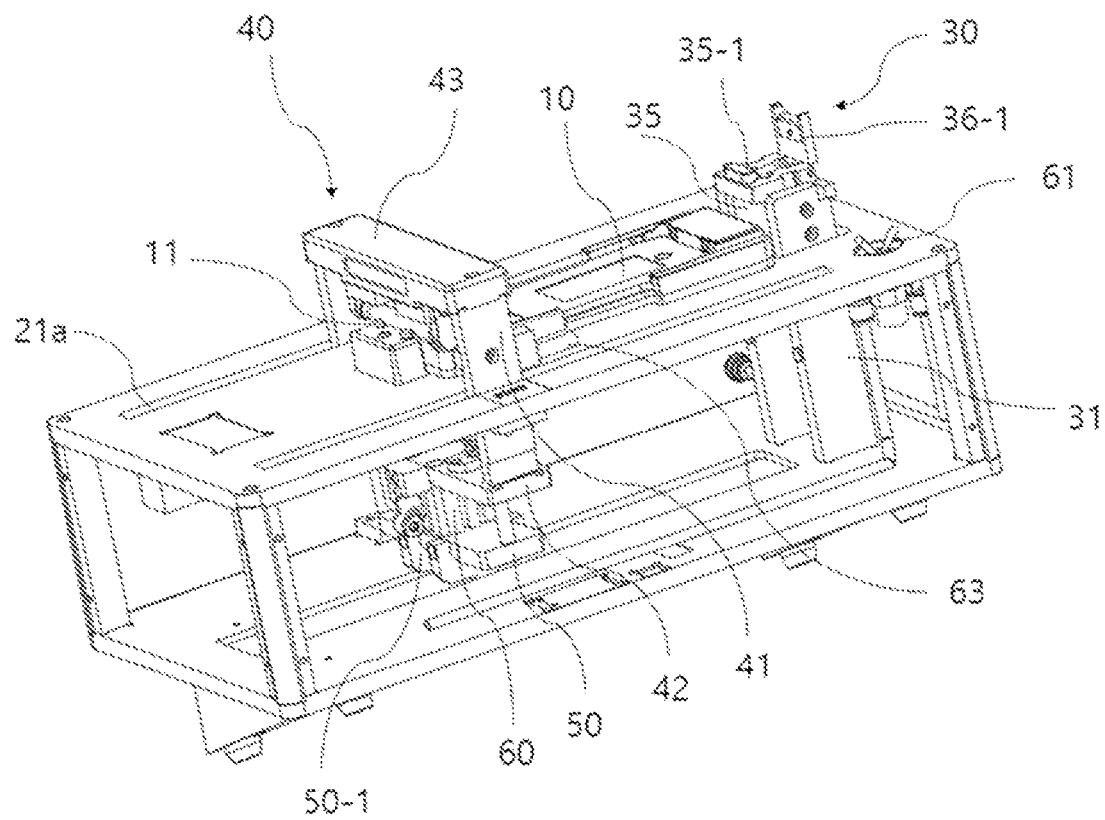

FIGS. 1 and 2 are perspective views showing a protection film attaching apparatus according to an embodiment of the present invention.

Figure 3:
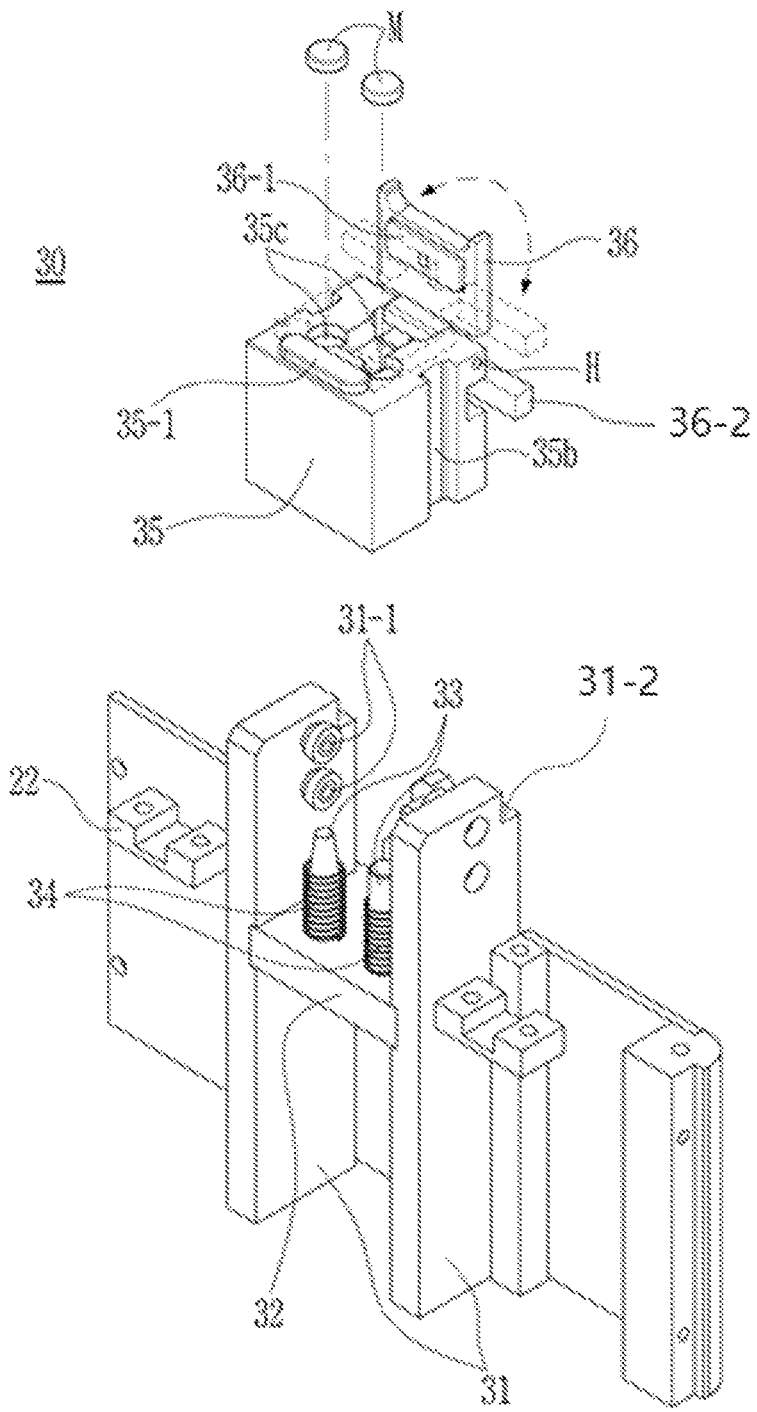
FIG. 3 is a perspective view showing the gripper of FIGS. 1 and 2 in detail.
Figure 4:
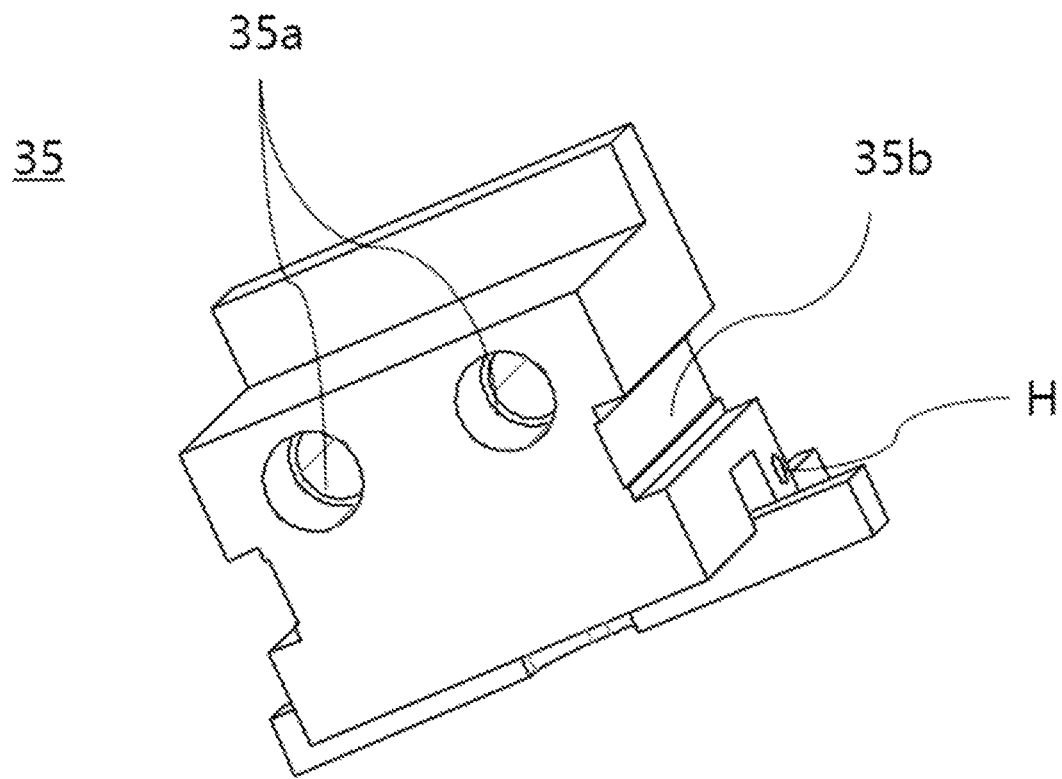
Figure 5:
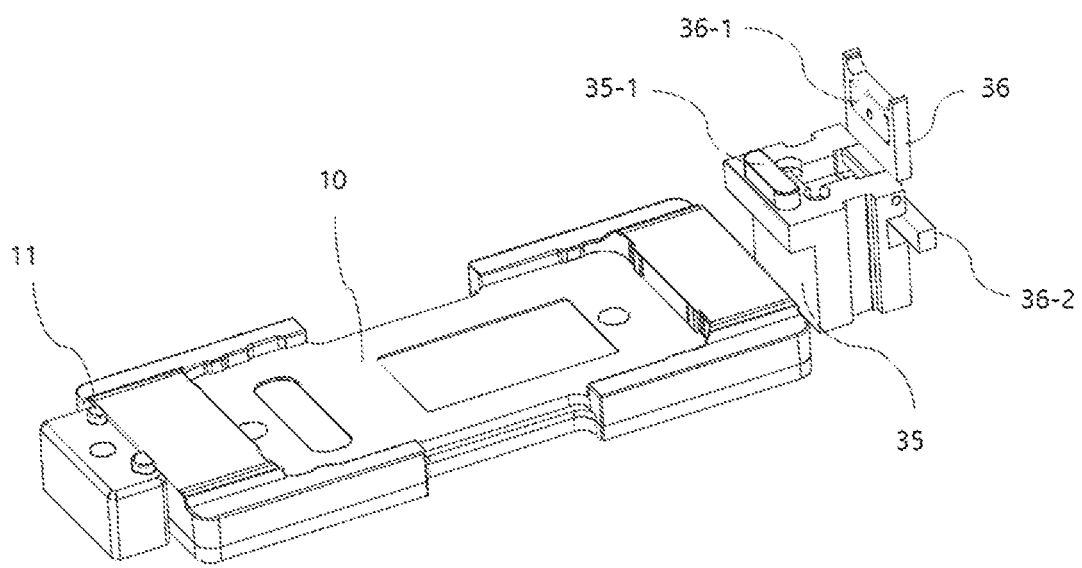
FIG. 5 is a perspective view showing the jig in detail.
Figure 6:
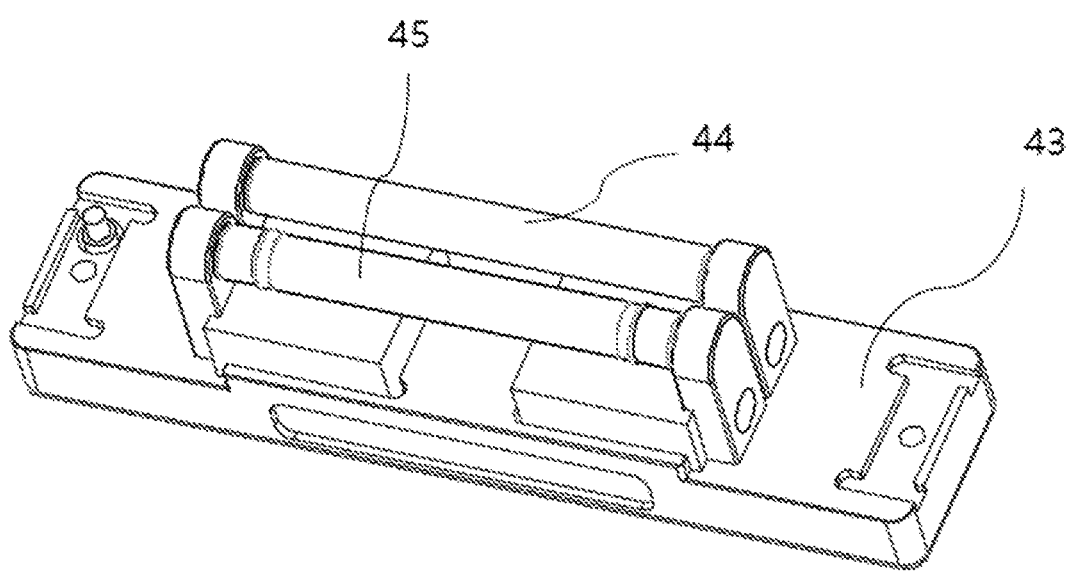
FIG. 6 is a perspective view showing the lower parts of the first and second rollers of FIGS. 1 and 2.
Figure 7:
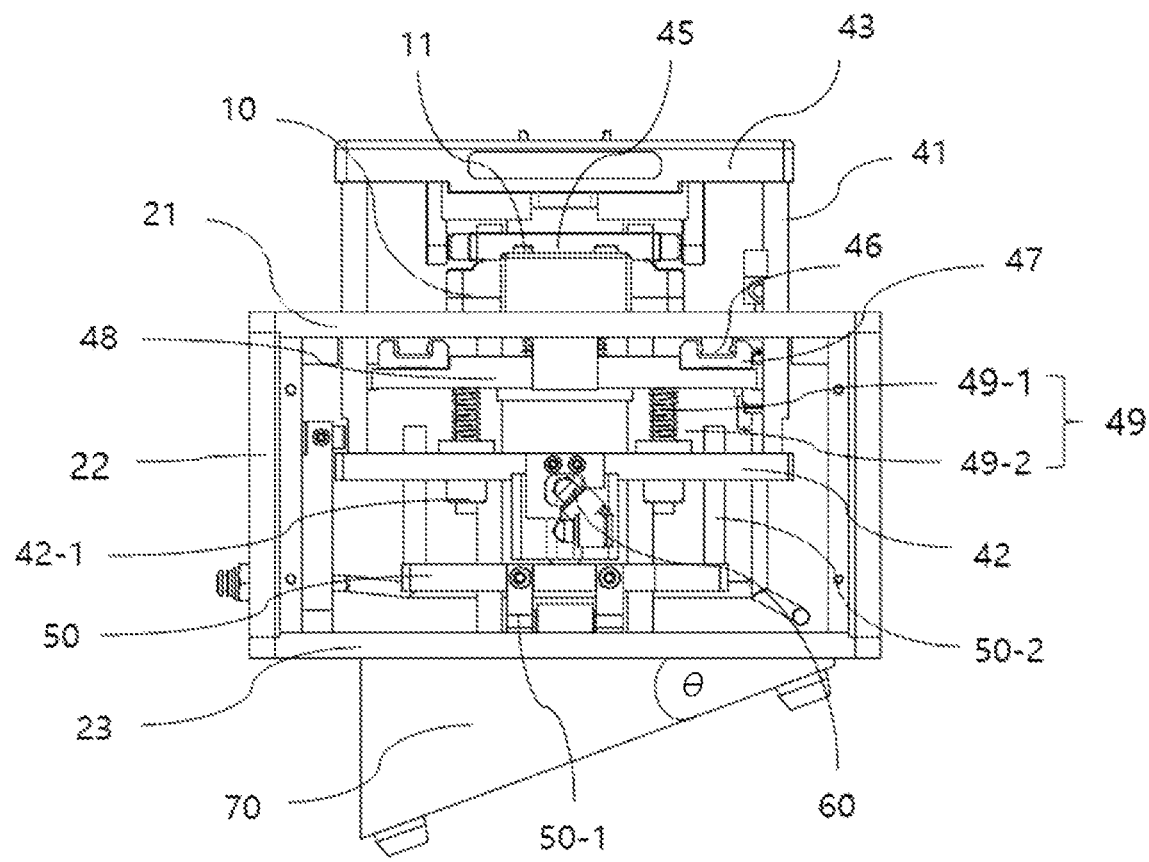
FIG. 7 is a perspective view showing the rear side of FIG. 2.
Figure 8:
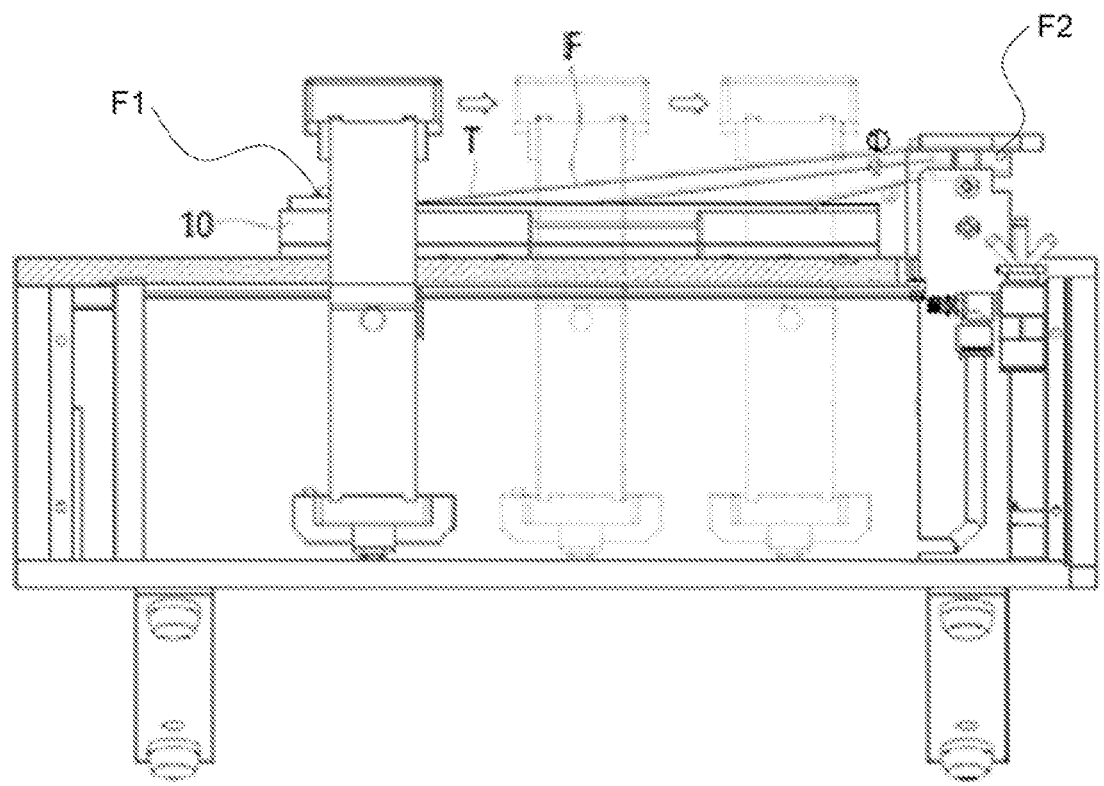
FIG. 8 is a side view showing an operation of the protection film attaching apparatus according to an embodiment of the present invention.

FIG. 3 is a perspective view showing the gripper of FIGS. 1 and 2 in detail, FIG. 4 is a perspective view showing a lower part of the elastic block of the gripper of FIG. 3, FIG. 5 is a perspective view showing the jig in detail, FIG. 6 is a detailed perspective view showing the lower parts of the first and second rollers of FIGS. 1 and 2, FIG. 7 is a perspective view showing the rear side of FIG. 2, and FIG. 8 is a side view showing an operation of the protection film attaching apparatus according to an embodiment of the present invention.

However, an upper shelf (21) to be described later is shown in partial cross-section so that the inside of a housing (20) can be shown, and one pair among two pairs of side panels (22) to be described later is omitted.

As shown in FIG. 1, the protection film attaching apparatus according to an embodiment of the present invention may include: a jig (10) where an electronic device (T) is mounted; the housing (20); a first fixing part (11), a gripper (30); a film attaching part (40); a supporting bar (50); and legs (80).

The electronic device (T) can be a smartphone, a tablet PC, and the like, and a display glass (G) having curved edges on both sides thereof is formed on one surface thereof. The curved edges of the glass (G) form corners and are integrally formed with the plane of the glass (G).

The glass (G) of the electronic device (T) is mounted on the jig (10) so as to face upward.

As a method of fixing the glass (G) to the jig (10), various known methods such as suctioning a lower part of the electronic device (T) or clamping a side of the electronic device (T) can be used, and further description of such methods is omitted.

At both ends of the protection film (F), a first hole (F1) through which the first fixing part (11) can penetrate, and a second fixing part (35-1) of an elastic block (35) to be described later can penetrate. Respective second holes (F2) may be provided.

The housing (20) may include a square-shaped upper shelf (21) on which the jig (10) is fixedly installed; two pairs of side panels (22) vertically standing and coupled to each edge of the upper shelf (21); and a lower panel (23) for connecting lower parts of the two pairs of side panels (22). Thus, the housing (20) may have a predetermined height while forming an inner space, and the upper shelf (21) of the housing (20) includes a through hole (21a) on both sides of the jig (10) in a lengthwise direction of the jig (10) so that a pair of standing bars (41) to be described later penetrate the upper shelf to be vertically installed.

The gripper (30) may be installed to be erected on one side of the lower panel (23) so that the other side of the protection film (F) may be elastically supported in a vertical direction. To this end, as shown in FIGS. 3 and 4, the gripper (30) may include: a pair of vertical plates (31), each of which is fixed to be separated at a predetermined distance on the side panel (22) and the lower panel (23); a horizontal plate (32) installed at a predetermined height of the pair of vertical plates (31); a circular protrusion protruding upward from an upper surface of the horizontal plate (32); a first spring (34) inserted into an outer circumferential surface of a circular protrusion (33); the elastic block (35) which is elastically guided in the vertical direction on the upper surface of the horizontal place (32) by having an accommodating groove (35a) for accommodating the circular protrusion (33) in a lower part thereof and includes the second fixing part (35-1) on one side of an upper part thereof for fixing another side of the protection film (F), and an insertion groove (35c) formed in a back of the second fixing part (35-1) so that a magnetic body (M) can be inserted thereinto; and a film pressing cover (36) including an iron plate (36-1) corresponding to the magnetic body (M) on one side thereof, and supporting an end part of the other side of the protection film (F) by being rotatably coupled to the other side of the upper part of the elastic block (35) when the insertion groove (35c) of the elastic block (35) is covered.

A stopper groove (31-2) integrated with the film pressing cover (36) is formed on one side of an upper end of the pair of vertical plates (31) so that when the film pressing cover (36) is lifted to insert or remove the protection film (F) into the second fixing part (35-1) of the gripper (30), a stopper bar (36-2) is inserted into the stopper groove in order to stop descent of the elastic block (35). Also, a plurality of guide protrusions (31-1) for guiding the elastic block (35) may be respectively installed on inner sides of the vertical plates facing each other.

The accommodating groove (35a) of the elastic block (35) is formed in two stages (preferably, the inlet part is formed to be larger) so that the first spring (34) can fit in to be compressible, and guide grooves (35b) in which the guide protrusions (31-1) of each vertical plate (31) can be accommodated may be provided on both sides of the elastic block (35).

The film pressing cover (36) may be rotatably coupled to the other upper side of the elastic block (35) with a hinge (H). The iron plate (36-1) of the film pressing cover (36) is installed to have an attraction force with the magnetic body (M) inserted into the insertion groove (35c) between the iron plate and the protection film (F) when the other side of the protection film (F) is fixed to the second fixing part (35-1).

The jig (10) may be installed to be separated from the first fixing part (11) and the gripper (30) as shown in FIG. 5.

The film attaching part (40) is installed to be supported by the housing (20) and to be movable in the lengthwise direction of the jig (10) so that the protection film (F) can be pressed against the glass (G) surface of the electronic device (T). To this end, the film attaching part (40) as shown in FIGS. 1, 2, and 7 may include: the pair of standing bars (41) which are erected by respectively penetrating the through holes (21a) of the housing (20); a lower end connecting bar (42) for connecting lower ends of the pair of standing bars (41); an upper end connecting bar (43) for connecting upper ends of the standing bars (41) to be integrally coupled therewith; a first roller (44), both ends of which are installed on one side of a lower part of the upper end connecting bar (43) for pressurizing an upper surface of the protection film (F); and a second roller (45) having both ends supported by another side of the lower part of the upper end connecting bar (43) and having outer diameters on both sides thereof which expand in a curved shape so as to pressurize an edge of the upper surface of the protection film (F). Here, a cylinder (42-1) may be further provided under a lower part of the lower end connecting bar (42).

In addition, the film attaching part (40) may further include: a pair of rails (46) installed in the lengthwise direction of the jig (10) at a lower part of the upper shelf (21) and a pair of moving bodies (47) movably coupled to the rails (46), respectively; a middle bar (48) integrally fixed to the pair of moving bodies (47); and an elastic body (49) installed between the middle bar (48) and the lower end connecting bar (42).

Each moving body (47) may be installed to be supported by both sides of the rails (46), and an upper end of the elastic body (49) is fixed to the middle bar (48) while a lower part thereof may comprise a fixed shaft (49-1) inserted to the cylinder (42-1) of the lower end connecting bar (42) and a second spring (49-2) installed on an outer circumference of the fixed shaft (49-1) and interposed between the middle bar (48) and the lower end connecting bar (42).

In addition, an air cylinder (60) may be provided to mount the electronic device (T) by lifting the film attaching part (40) and then lower the film attaching part (40) to attach the protection film (F). To this end, the air cylinder (60) is fixedly installed between an upper end and the lower end connecting bar (42) of the supporting bar (50), and a rolling wheel (50-1) may be further installed at a lower end of the supporting bar (50).

The supporting bar (50) may further include a fixed shaft (50-2), and the lower end connecting bar (42) may further include a fixed shaft accommodating groove (50-3).

In this case, the air cylinder (60) may be operated by being connected to an air compressor (not shown) through an air hose (62) and a switch (61).

As shown in FIGS. 1 and 2, the legs (80) may be installed as a pair on a lower part of the lower panel (23), and when the film is attached, the housing (20) moves forward to be tilted at an angle θ.

Hereinafter, operation of the protection film attaching apparatus of the present invention is described with reference to FIGS. 1 and 2 showing an operating state.

First, the film pressing cover (36) is lifted and opened. Then, the stopper bar (36-2) integrally provided with the film pressing cover (36) is inserted into the elastic block stopper groove (31-2) formed on the one side of the upper end of the pair of vertical plates (31) so as to prevent the elastic block (35) from descending. Then, the electronic device (T) is mounted on an upper surface of the jig (10) so that the glass (G) faces upward, the one and the other sides of the protection film (F) are coupled to the first fixing part (11) and the second fixing part (35-1), respectively, and covered with the film pressing cover (36). In this scenario, the elastic block (35) is in a state of being able to descend again.

The switch (61) is turned ON, and the air cylinder (60) is operated so that the lower end connecting bar (42) ascends, lifting the film attaching part (40) to a predetermined height.

When the film attaching part (40) is lifted to a predetermined height, the film attaching part (40) is moved to a start point for attaching the protection film between the first fixing part (11) and the jig (10), and the switch (61) is turned OFF. As the lower end connecting bar (42) descends by way of a return action of the air cylinder (60), the film attaching part (40) descends while maintaining a constant height and pressure.

After this, as shown in FIG. 8, when the film attaching part (40) is pulled in the lengthwise direction of the jig (10), the first roller (44) presses the upper surface of the glass (G) of the electronic device (T), and thus the second roller (45) continuously presses curved surfaces of both sides of the glass (G) to uniformly attach the protection film (F) to the curved surfaces of both sides of the glass (G).

In this case, if a switch operating bar (63) provided on one side of the pair of standing bars (41) is pressed to be turned ON to start the air cylinder (60), the lower end connecting bar (42) ascends, and the film attaching part (40) is lifted to a predetermined height.

Meanwhile, when the film attaching part (40) is moved, the elastic block (35) of the gripper (30) supports the other side of the protection film (F) in the vertical direction so that an appropriate tension can be maintained in the protection film (F). Thus, as shown in FIG. 8, as the film attaching part (40) moves from left to right, the elastic block (35) supported by the first spring (34) gradually descends elastically, and the other side of the protection film (F) descends to the shown positions of <1>, <2> and <3>, so that a uniform tension can be maintained in the protection film (F).

According to the protection film attaching apparatus of the present invention described above, when the protection film is attached to the glass surface including curved corners, it is attached airtightly and prevents air bubbles on the surface of the glass, and the attaching process becomes easier and more effectively done.

Plus, due to the separation of the jig (10), the first fixing part (11), and the gripper (30) from one another, when replacing the jig (10) according to the size of the electronic device (T) such as a smartphone or a tablet PC, only the jig (10) needs to be replaced, and thus costs and efforts for balancing the first fixing part (11) and the second fixing part (35-1) can be reduced.

In addition, it is much easier to attach the protection film as the legs (70) are inclined at the angle θ, causing the housing (20) to be inclined forward.

As described above, although the present invention has been described by the limited embodiments and drawings, it is not limited thereto, and various modifications and variations are also possible within the technical idea of the present invention and the range of claims to be described below by a person skilled in the art to which this invention belongs.

INDUSTRIAL APPLICABILITY

The protection film attaching apparatus of the present invention has industrial applicability.

The invention claimed is:

1. A protection film attaching apparatus for attaching a protection film onto a glass surface of an electronic device, comprising:
  a housing having a through hole having a width and a length in a lengthwise direction of an upper shelf;
  a jig installed on an upper surface of the housing where the electronic device is mounted;
  a first fixing part installed on one side of the jig and fixing one side of the protection film;
  a gripper installed on one side of the housing and configured for elastically supporting another side of the protection film; and
  a film attaching part installed in the housing to move in a lengthwise direction of the jig so as to pressurize and attach the protection film onto the glass surface of the electronic device, wherein the film attaching part includes:
a pair of rails installed in the lengthwise direction of the jig on a lower part of the upper shelf;
a pair of moving bodies movably coupled to each of the pair of rails;
a middle bar integrally fixed to the pair of moving bodies;
an elastic body installed between the middle bar and a lower end connecting bar;
a pair of standing bars which are erected by respectively penetrating through holes of the upper shelf;
a lower end connecting bar for connecting lower ends of the pair of standing bars;
an upper end connecting bar for connecting upper ends of the standing bars to be integrally coupled therewith; and
one or more rollers installed on one side of a lower part of the upper end connecting bar for pressurizing an upper surface of the protection film.

2. The protection film attaching apparatus of claim 1, wherein the gripper includes:
an elastic block installed on top ends of a pair of vertical plates; and
a horizontal plate fixed at the pair of the vertical plates, wherein the elastic block is elastically guided in a vertical direction on an upper surface of the horizontal plate and includes a second fixing part on one side of a top part thereof for fixing the other side of the protection film.

3. The protection film attaching apparatus of claim 1, wherein the gripper includes:
an elastic block having an insertion groove located in a back of a second fixing part so that a magnetic body can be inserted into the insertion groove; and
an iron plate corresponding to the magnetic body on one side thereof, supporting an end part of the other side of the protection film and rotatably coupled to another side of a top part of the elastic block.

4. The protection film attaching apparatus of claim 1, wherein the one or more rollers include:
one or more first rollers for pressurizing the upper surface of the protection film; and
one or more second rollers having outer diameters on both sides thereof which expand in a curved shape so as to pressurize an edge of the upper surface of the protection film.

5. The protection film attaching apparatus of claim 1, wherein the one or more rollers include a first roller installed on one front side of a lower part of the upper end connecting bar for pressurizing a part of the upper surface of the protection film; and
a second roller installed in parallel with the first roller and having an outer diameter which expand in a curved shape on both sides thereof so as to pressurize a curved part of an edge of the upper surface of the protection film.

6. The protection film attaching apparatus of claim 1, further comprising a leg detachably installed to be fixed in a pair on a lower surface of a lower panel of the housing so as to obliquely support the housing.

7. The protection film attaching apparatus of claim 1, wherein the jig is detachably installed on the upper surface of the housing and configured to be separated from the first fixing part and the gripper.

8. A protection film attaching apparatus for attaching a protection film onto a glass surface of an electronic device, comprising:
a housing having a through hole having a width and a length in a lengthwise direction of an upper shelf;
a jig installed on an upper surface of the housing where the electronic device is mounted;
a first fixing part installed on one side of the jig and fixing one side of the protection film;
a gripper installed on one side of the housing and configured for elastically supporting another side of the protection film; and
a film attaching part installed in the housing to move in a lengthwise direction of the jig so as to pressurize and attach the protection film onto the glass surface of the electronic device,
wherein the protection film includes a first hole on one side thereof which a first fixing part penetrates; and
a second hole on another side thereof which a second fixing part of the gripper penetrates,
wherein a width of a part of the protection film which the first and second fixing parts penetrate on both sides is narrower than the other widths of the other entire part of the protection film.

* * * * *